(12) United States Patent
Toyomaru et al.

(10) Patent No.: US 9,935,530 B2
(45) Date of Patent: Apr. 3, 2018

(54) METHOD FOR MANUFACTURING BAND-SHAPED STATOR CORE SHEETS

(71) Applicant: Mitsui High-tec, Inc., Kitakyushu-shi, Fukuoka (JP)

(72) Inventors: Yohei Toyomaru, Kitakyushu (JP); Shusaku Munaoka, Kitakyushu (JP); Yoshiharu Kouno, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 641 days.

(21) Appl. No.: 14/328,939

(22) Filed: Jul. 11, 2014

(65) Prior Publication Data

US 2015/0020375 A1 Jan. 22, 2015

(30) Foreign Application Priority Data

Jul. 19, 2013 (JP) .................................. 2013-150464

(51) Int. Cl.
  *H02K 15/02* (2006.01)
(52) U.S. Cl.
  CPC .......... *H02K 15/024* (2013.01); *H02K 15/026* (2013.01); *Y10T 29/49009* (2015.01); *Y10T 29/53161* (2015.01)
(58) Field of Classification Search
  CPC ................ H02K 15/024; H02K 15/026; Y10T 29/49009; Y10T 29/53161
  See application file for complete search history.

(56) References Cited

U.S. PATENT DOCUMENTS

| 7,336,014 B2* | 2/2008 | Lee ......................... H02K 1/148 310/216.001 |
| 2001/0030484 A1* | 10/2001 | Nakamura ............... H02K 1/16 310/216.071 |

(Continued)

FOREIGN PATENT DOCUMENTS

| CN | 1489262 A | 4/2004 |
| CN | 102077448 A | 5/2011 |

(Continued)

OTHER PUBLICATIONS

Office Action dated May 30, 2016, issued in counterpart Chinese Patent Application No. 201410325310.0, with English translation. (12 pages).

*Primary Examiner* — A. Dexter Tugbang
*Assistant Examiner* — Jeffrey T Carley
(74) *Attorney, Agent, or Firm* — Westerman, Hattori, Daniels & Adrian, LLP

(57) ABSTRACT

Provided are a method for manufacturing band-shaped stator core sheets, capable of efficiently separating the band-shaped stator core sheets having engaged magnetic pole pieces, and a die apparatus used therefor.
The method comprises placing tips of magnetic pole pieces 12, 13 of first and second band-shaped stator core sheets 10, 11 on inner peripheries of yoke pieces 16, 15, a slot punching step for forming gaps of the magnetic pole pieces 12, 13, a shear-cutting step for cutting the tips of the magnetic pole pieces 12, 13 from the inner peripheries of the yoke pieces 16, 15, respectively, a correction step for returning the magnetic pole pieces 12, 13 bent by the shear-cutting step to their original states, and a separation step for separating the first and second band-shaped stator core sheets 10, 11 with the magnetic pole pieces 12, 13 pressed back by the correction step.

9 Claims, 9 Drawing Sheets

(56) References Cited

U.S. PATENT DOCUMENTS

| | | | |
|---|---|---|---|
| 2002/0114824 A1* | 8/2002 | Fukui | H02K 15/022 424/432 |
| 2005/0109178 A1* | 5/2005 | Oba | B21D 28/06 83/50 |
| 2007/0193329 A1* | 8/2007 | Oba | B21D 28/06 72/404 |
| 2009/0083965 A1* | 4/2009 | Tokizawa | H02K 15/026 29/596 |
| 2011/0154650 A1* | 6/2011 | Hashimoto | H02K 1/146 29/598 |
| 2014/0250968 A1 | 9/2014 | Furuta et al. | |

FOREIGN PATENT DOCUMENTS

| | | | | |
|---|---|---|---|---|
| GB | 411746 A | | 6/1934 | |
| JP | 57-85552 A | | 5/1982 | |
| JP | 60016159 A | * | 1/1985 | ........... H02K 15/026 |
| JP | 2-106151 A | | 4/1990 | |
| JP | 11-299136 A | | 10/1999 | |
| JP | 2001-359246 A | | 12/2001 | |
| JP | 2009-81973 A | | 4/2009 | |
| WO | 2013/077193 A1 | | 5/2013 | |

\* cited by examiner

PRIOR ART

PRIOR ART

METHOD FOR MANUFACTURING BAND-SHAPED STATOR CORE SHEETS

TECHNICAL FIELD

The present invention relates to a method for manufacturing band-shaped stator core sheets used in manufacture of laminated cores and to a die apparatus used therefor. More specifically, the present invention relates to a method for manufacturing band-shaped stator core sheets, which are helically wound to form laminated bodies of laminated cores, and to a die apparatus used therefor.

BACKGROUND ART

Conventionally, there has been a laminated core, as illustrated in FIG. 8(A), produced by helically winding and laminating a band-shaped core sheet (band-shaped stator core sheet) 90, which was formed in a die by stamping, outside the die to form a laminated body (e.g., see Patent Document 1). In forming the band-shaped core sheet 90, as illustrated in FIG. 8(B), blank layout is performed such that a magnetic strip material 92 includes two pieces of the band-shaped core sheets 90 with magnetic pole pieces 91 of the band-shaped core sheets 90 engaged with one another and thereafter the band-shaped core sheets 90 are blanked out so as to improve material yield.

However, as illustrated in FIG. 8(B), since the blank layout of the two band-shaped core sheets 90 on the magnetic strip material 92 is performed such that a gap 94 is formed between the tip of each magnetic pole piece 91 of one of the band-shaped core sheets 90 and the inner periphery of a yoke piece 93 between adjacent magnetic pole pieces 91 of the other one of the band-shaped core sheets 90, it has been impossible to further improve the material yield.

To overcome this difficulty, as illustrated in FIG. 9, blank layout of two band-shaped core sheets (band-shaped stator core sheets) 95 is performed on a magnetic strip material 98 such that the tips of respective magnetic pole pieces 96 of one of the band-shaped core sheets 95 are in contact with the inner periphery of a yoke piece 97 between adjacent magnetic pole pieces 96 of the other one of the band-shaped core sheets 95. In FIG. 9, blank layout is performed such that a single sheet of the magnetic strip material 98 includes four rows of the band-shaped core sheets 95 (e.g., see Patent Literature 2).

CITATION LIST

Patent Literature

Patent Literature 1: Japanese Unexamined Patent Application Publication No. H02-106151
Patent Literature 2: Japanese Unexamined Patent Application Publication No. H11-299136

SUMMARY OF INVENTION

Technical Problem

In a case where the above blank layout is adopted, however, the separation of the tips of the magnetic pole pieces 96 from the inner periphery of the yoke piece 97 involves shear cutting (cutting and bending). Thus, the tips of the magnetic pole pieces 96 are press-fitted to the inner periphery of the yoke piece 97 as described below.

For example, since the magnetic pole pieces 96 are bent downward at the time of shear-cutting, it has been a practice to correct bending of the magnetic pole pieces 96 by placing the bent magnetic pole pieces 96 between a stripper plate and a die in the subsequent step. On the other hand, since material width near the shear cut is broadened by the shear-cutting, the tips of the magnetic pole pieces 96 are press-fitted to the inner periphery of the yoke piece 97 at the time of bending correction.

Moreover, in a case where the tips of the magnetic pole pieces 96 are shear cut from the inner periphery of the yoke piece 97 within the elastic limit of the magnetic strip material 98, the force of the magnetic pole pieces 96 trying to return to their original state could cause the tips thereof to be press-fitted to the inner periphery of the yoke piece 97.

If the tips of the magnetic pole pieces 96 are press-fitted to the inner periphery of the yoke piece 97 in this manner, a problem arises that, at the time of either rolling up or winding and laminating the band-shaped core sheets 95, it becomes difficult to separate the band-shaped core sheets 95 having the engaged magnetic pole pieces 96.

The present invention has been achieved in view of the above circumstances, and an object thereof is to provide a method for manufacturing band-shaped stator core sheets and a die apparatus used therefor, capable of efficiently separating the band-shaped stator core sheets whose magnetic pole pieces are engaged with one another.

Solution to Problem

In accordance with a first aspect of the present invention for attaining the above object, there is provided a method for manufacturing band-shaped stator core sheets by performing blank layout such that a magnetic strip material includes at least two rows of first and second band-shaped stator core sheets with magnetic pole pieces of the first and second band-shaped stator core sheets engaged with one another and thereafter separating the first and second band-shaped stator core sheets from the magnetic strip material by press work, the method comprising: placing tips of the respective magnetic pole pieces of the first band-shaped stator core sheet on an inner periphery of a yoke piece between adjacent ones of the magnetic pole pieces of the second band-shaped stator core sheet, and placing tips of the respective magnetic pole pieces of the second band-shaped stator core sheet on an inner periphery of a yoke piece between adjacent ones of the magnetic pole pieces of the first band-shaped stator core sheet; a slot punching step for punching out slots to form gaps of the respective magnetic pole pieces of the first and second band-shaped stator core sheets; a shear-cutting step for shear-cutting the tips of the respective magnetic pole pieces of the first and second band-shaped stator core sheets from the inner peripheries of the yoke pieces; a correction step for returning the magnetic pole pieces of the first and second band-shaped stator core sheets having been bent by the shear-cutting step to their original states; and a separation step for separating the first and second band-shaped stator core sheets with the magnetic pole pieces having been pressed back by the correction step.

In accordance with a second aspect of the present invention for attaining the above object, there is provided a method for manufacturing band-shaped stator core sheets by performing blank layout such that a magnetic strip material includes at least two rows of first and second band-shaped stator core sheets with magnetic pole pieces of the first and second band-shaped stator core sheets engaged with one another and thereafter separating the first and second band-shaped stator core sheets from the magnetic strip material by press work, the method comprising: placing tips of the respective magnetic pole pieces of the first band-shaped stator core sheet on an inner periphery of a yoke piece between adjacent ones of the magnetic pole pieces of the second band-shaped stator core sheet, and placing tips of the respective magnetic pole pieces of the second band-shaped stator core sheet on an inner periphery of a yoke piece between adjacent ones of the magnetic pole pieces of the first band-shaped stator core sheet; a slot punching step for punching out slots to form gaps of the respective magnetic pole pieces of the first and second band-shaped stator core sheets; a shear-cutting step for shear-cutting the tips of the respective magnetic pole pieces of the first and second band-shaped stator core sheets from the inner peripheries of the yoke pieces within an elastic limit of the magnetic strip material; and a separation step for separating the first and second band-shaped stator core sheets with the tips of the magnetic pole pieces having been shear cut from the inner peripheries of the yoke pieces by the shear-cutting step.

In the methods for manufacturing band-shaped stator core sheets according to the first and second aspects of the present invention, it is preferable that, in the separation step, the first and second band-shaped stator core sheets are gradually separated vertically by an upper die separation part provided to an upper die and a lower die separation part provided to a lower die.

In the methods for manufacturing band-shaped stator core sheets according to the first and second aspects of the present invention, it is preferable that the upper die separation part is provided with a first projection adapted to be brought into contact from above with the first band-shaped stator core sheet, and the lower die separation part is provided with a second projection adapted to be brought into contact from below with the second band-shaped stator core sheet.

In the methods for manufacturing band-shaped stator core sheets according to the first and second aspects of the present invention, an undersurface of the first projection can be brought into contact with either one or both of the magnetic pole pieces and the yoke piece of the first band-shaped stator core sheet, and an upper surface of the second projection can be brought into contact with either one or both of the magnetic pole pieces and the yoke piece of the second band-shaped stator core sheet.

In the methods for manufacturing band-shaped stator core sheets according to the first and second aspects of the present invention, it is preferable that the first and second projections have chamfers on upstream sides thereof to be brought into contact with the magnetic pole pieces so as to avoid catching on the first and second band-shaped stator core sheets being conveyed.

In the methods for manufacturing band-shaped stator core sheets according to the first and second aspects of the present invention, it is preferable that the undersurface of the first projection is gradually sloped downward toward a downstream side in a conveyance direction of the first and second band-shaped stator core sheets.

In the methods for manufacturing band-shaped stator core sheets according to the first and second aspects of the present invention, it is preferable that the upper surface of the second projection is gradually sloped downward at an angle smaller than an inclination angle of the undersurface of the first projection toward the downstream side in the conveyance direction of the first and second band-shaped stator core sheets.

In the methods for manufacturing band-shaped stator core sheets according to the first and second aspects of the present invention, it is preferable that the respective yoke pieces of the first and second band-shaped stator core sheets are supported by lifters provided to the lower die.

In the methods for manufacturing band-shaped stator core sheets according to the first and second aspects of the present invention, the magnetic strip material can include the first and second band-shaped stator core sheets arranged in four rows.

In accordance with a third aspect of the present invention for attaining the above object, there is provided a die apparatus for use in the method for manufacturing band-shaped stator core sheets according to the first and second aspects of the present invention, comprising: a first projection adapted to be brought into contact from above with the first band-shaped stator core sheet, the first projection being provided to the upper die separation part disposed on the upper die; and a second projection adapted to be brought into contact form below with the second band-shaped stator core sheet, the second projection being provided to the lower die separation part disposed on the lower die.

In the die apparatus according to the third aspect of the present invention, it is preferable that an undersurface of the first projection is gradually sloped downward toward a downstream side in a conveyance direction of the first and second band-shaped stator core sheets.

In the die apparatus according to the third aspect of the present invention, it is preferable that an upper surface of the second projection is gradually sloped downward at an angle smaller than an inclination angle of the undersurface of the first projection toward the downstream side in the conveyance direction of the first and second band-shaped stator core sheets.

In the die apparatus according to the third aspect of the present invention, it is preferable that the first and second projections have chamfers on upstream sides thereof to be brought into contact with the magnetic pole pieces so as to avoid catching on the first and second band-shaped stator core sheets being conveyed.

In the die apparatus according to the third aspect of the present invention, it is preferable that the lower die is further provided with lifters for supporting the yoke pieces of the first and second band-shaped stator core sheets.

Advantageous Effects of Invention

The methods for manufacturing band-shaped stator core sheets according to the first and second aspects of the present invention, and the die apparatus for use in the method for manufacturing band-shaped stator core sheets according to the third aspect of the present invention include the separation step (the die apparatus used therefor). As a result, when the band-shaped stator core sheets are rolled up or, alternatively, wound and laminated, the band-shaped stator core sheets having the engaged magnetic pole pieces can be efficiently separated from each other.

In particular, in the method for manufacturing band-shaped stator core sheets according to the first aspect of the present invention, since the separation step is performed after successively performing the shear-cutting step and the correction step, the tips of the magnetic pole pieces tend to be press-fitted to the inner peripheries of the yoke pieces. Therefore, the above-described effect becomes more prominent.

Furthermore, in the separation step, in a case where the first and second band-shaped stator core sheets are gradually separated vertically by the upper die separation part and the lower die separation part respectively provided to the upper die and the lower die, and especially where they are separated by the first projection, which is provided to the upper die separation part and adapted to be brought into contact from above with the first band-shaped stator core sheet, and the second projection, which is provided to the lower die separation part and adapted to be brought into contact from below with the second band-shaped stator core sheet, the first and second projections do not interfere with each other. Therefore, the first and second band-shaped stator core sheets can be reliably separated from each other.

Here, in a case where either the undersurface of the first projection or the upper surface of the second projection is brought into contact with the magnetic pole pieces of the band-shaped stator core sheet, the magnetic pole pieces fitted to the inner periphery of the yoke piece can be easily separated therefrom. Furthermore, in a case where either the undersurface of the first projection or the upper surface of the second projection is brought into contact with the yoke piece of the band-shaped stator core sheet, the inner periphery of the yoke piece fitted to the magnetic pole pieces can be easily separated therefrom.

In a case where the first and second projections have the chamfers on the upstream sides thereof to be brought into contact with the magnetic pole pieces so as to avoid catching on the first and second band-shaped stator core sheets being conveyed, the first and second band-shaped stator core sheets can be smoothly conveyed toward the downstream side.

In a case where the undersurface of the first projection is gradually sloped downward toward the downstream side in the conveyance direction of the first and second band-shaped stator core sheets, the first projection gradually engages with the respective magnetic pole pieces of the first band-shaped stator core sheet toward the downstream side of the separation step. As a result, deformation of the first and second band-shaped stator core sheets due to press by the first and second projections can be avoided.

Here, in a case where the upper surface of the second projection is gradually sloped downward at an angle smaller than the inclination angle of the undersurface of the first projection toward the downstream side in the conveyance direction of the first and second band-shaped stator core sheets, the engaging amount of the respective magnetic pole pieces of the first band-shaped stator core sheet pushed downward by the first projection can be made small with respect to the second projection disposed on the downstream side of the separation step. Such a configuration further prevents the respective magnetic pole pieces of the first band-shaped stator core sheet from catching on the second projection, thereby allowing smooth conveyance of the first and second band-shaped stator core sheets toward the downstream side.

Moreover, in a case where the respective yoke pieces of the first and second band-shaped stator core sheets are supported by the lifters provided to the lower die, the first and the second band-shaped stator core sheets can be prevented from catching on the upper die separation part or the lower die separation part while being conveyed toward the downstream side, thereby improving work efficiency in the manufacture of the first and second band-shaped stator core sheets.

Furthermore, in a case where the magnetic strip material includes the first and second band-shaped stator core sheets arranged in four rows, production efficiency of the band-shaped stator core sheets can be improved.

DESCRIPTION OF EMBODIMENTS

For a more complete understanding of the present invention, an embodiment of the present invention will now be described with reference to the accompanying drawings.

Figure 1:
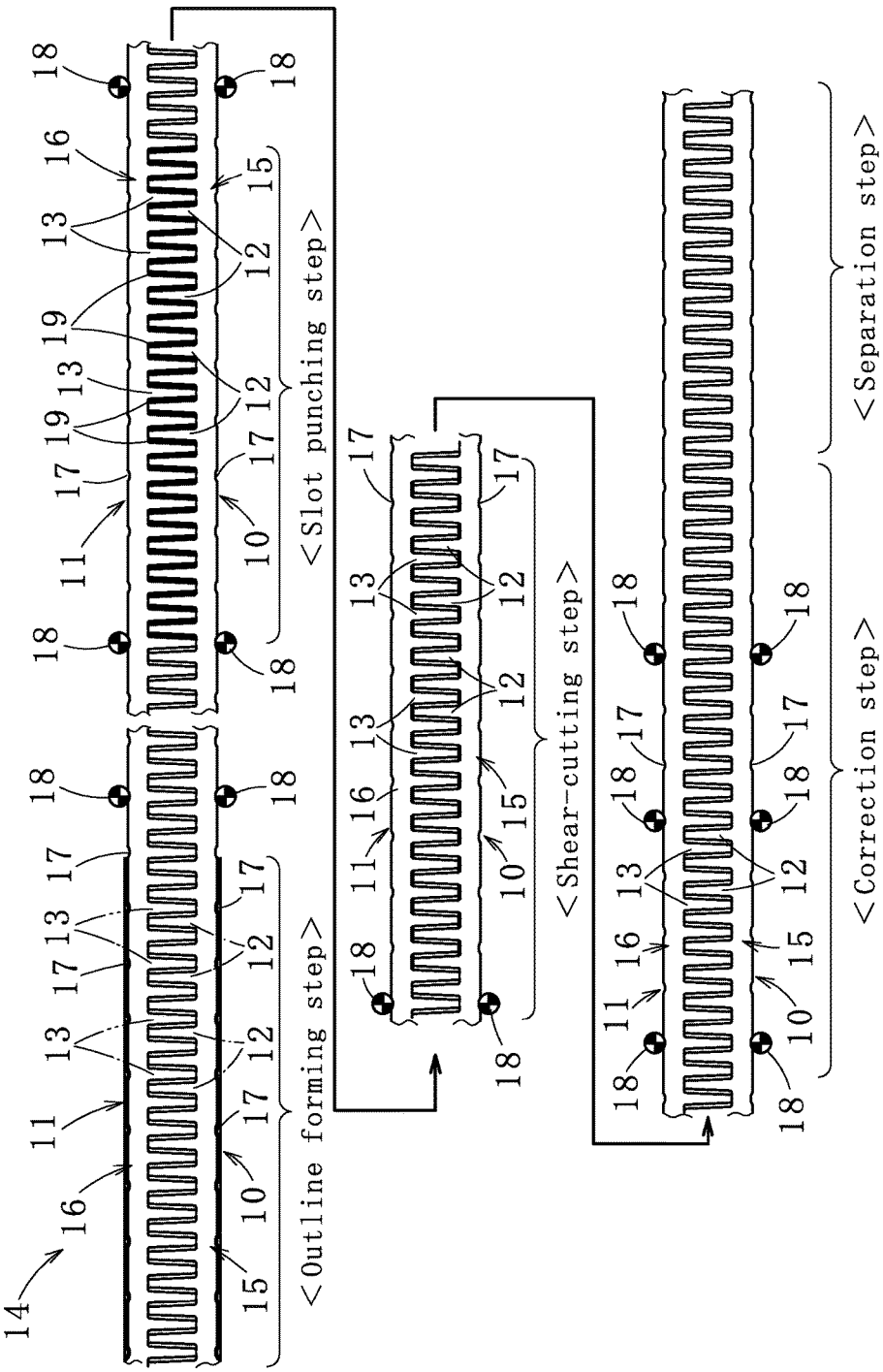
FIG. 1 is an explanatory diagram of a method for manufacturing band-shaped stator core sheets according to one embodiment of the present invention.

As illustrated in FIG. 1, a method for manufacturing band-shaped stator core sheets according to one embodiment of the present invention is a method to manufacture first and second band-shaped stator core sheets (hereafter, also simply referred to as band-shaped core sheets) 10 and 11 by performing blank layout such that a magnetic strip material 14 includes the first and second band-shaped core sheets 10 and 11 with magnetic pole pieces 12 and 13 of the first and second band-shaped core sheets 10 and 11 engaged with one another and thereafter separating the first and second band-shaped core sheets 10 and 11 from the magnetic strip material 14 by press work. The method includes a preparation step, an outline forming step, a slot punching step, a shear-cutting step, a correction step, and a separation step. The method will be described in detail below.

(Preparation Step)

The blank layout of the first and second band-shaped core sheets 10 and 11 is performed on the magnetic strip material 14 fabricated of a magnetic steel sheet having a thickness of, e.g., about 0.15 to 0.5 mm. These first and second band-shaped core sheets 10 and 11 are substantially of the same shape and respectively have yoke pieces 15 and 16 and a plurality of magnetic pole pieces 12 and 13, which are provided integrally with and protruding at inner peripheral sides (one sides) of the yoke pieces 15 and 16, respectively.

In the above-described blank layout, tips of the respective magnetic pole pieces 12 of the band-shaped core sheet 10 on one side are placed on an inner periphery of the yoke piece 16 between adjacent ones of the magnetic pole pieces 13 of the band-shaped core sheet 11 on the opposite side, and tips of the respective magnetic pole pieces 13 of the band-shaped core sheet 11 on the opposite side are placed on an inner periphery of the yoke piece 15 between adjacent ones of the magnetic pole pieces 12 of the band-shaped core sheet 10 on one side.

(Outline Forming Step)

Both widthwise ends of the magnetic strip material 14 are punched out by a die apparatus (not illustrated) to form outlines (outer peripheries) of the yoke pieces 15 and 16 of the respective band-shaped core sheets 10 and 11. At this time, notches 17 for positioning of the magnetic strip material 14 are also formed on the outer peripheries of the respective yoke pieces 15 and 16.

This allows positioning of the magnetic strip material 14 by fitting the notches 17 formed on the magnetic strip material 14 to pilot pins 18 placed on both widthwise sides of the magnetic strip material 14. A feed pitch for conveying the magnetic strip material 14 is equal to, e.g., the length of a region of the magnetic strip material 14 (the outline of which is shown with a thick line) shown at the outline forming step illustrated in FIG. 1.

(Slot Punching Step)

Slots 19 are punched out from the magnetic strip material 14 having the outlines of the yoke pieces 15 and 16.

To be specific, the slots 19 are punched out so that gaps (i.e., outlines on both sides of the magnetic pole pieces 12 and 13) are formed each between the magnetic pole pieces 12 and 13 in an engaging state.

This creates a state where only the tips of the respective magnetic pole pieces 12 of the band-shaped core sheet 10 on one side are connected with the inner periphery of the yoke piece 16 of the band-shaped core sheet 11 on the opposite side and only the tips of the respective magnetic pole pieces 13 of the band-shaped core sheet 11 on the opposite side are connected with the inner periphery of the yoke piece 15 of the band-shaped core sheet 10 on one side.

(Shear-Cutting Step)

The tips of the magnetic pole pieces 12 and 13 of the two band-shaped core sheets 10 and 11 are shear cut (cut and bent) from the inner peripheries of the yoke pieces 16 and 15, respectively. The shear cutting is a method (known conventional method) of cutting the tips of the magnetic pole pieces 12 and 13 respectively from the inner peripheries of the yoke pieces 16 and 15 by shearing. Consequently, the tips of the magnetic pole pieces 12 and 13 are respectively cut from the inner peripheries of the yoke pieces 16 and 15. At this time, the respective magnetic pole pieces 12 are bent toward below the yoke piece 16 and the respective magnetic pole pieces 13 are bent toward below the yoke piece 15.

(Correction Step)

Figure 2:
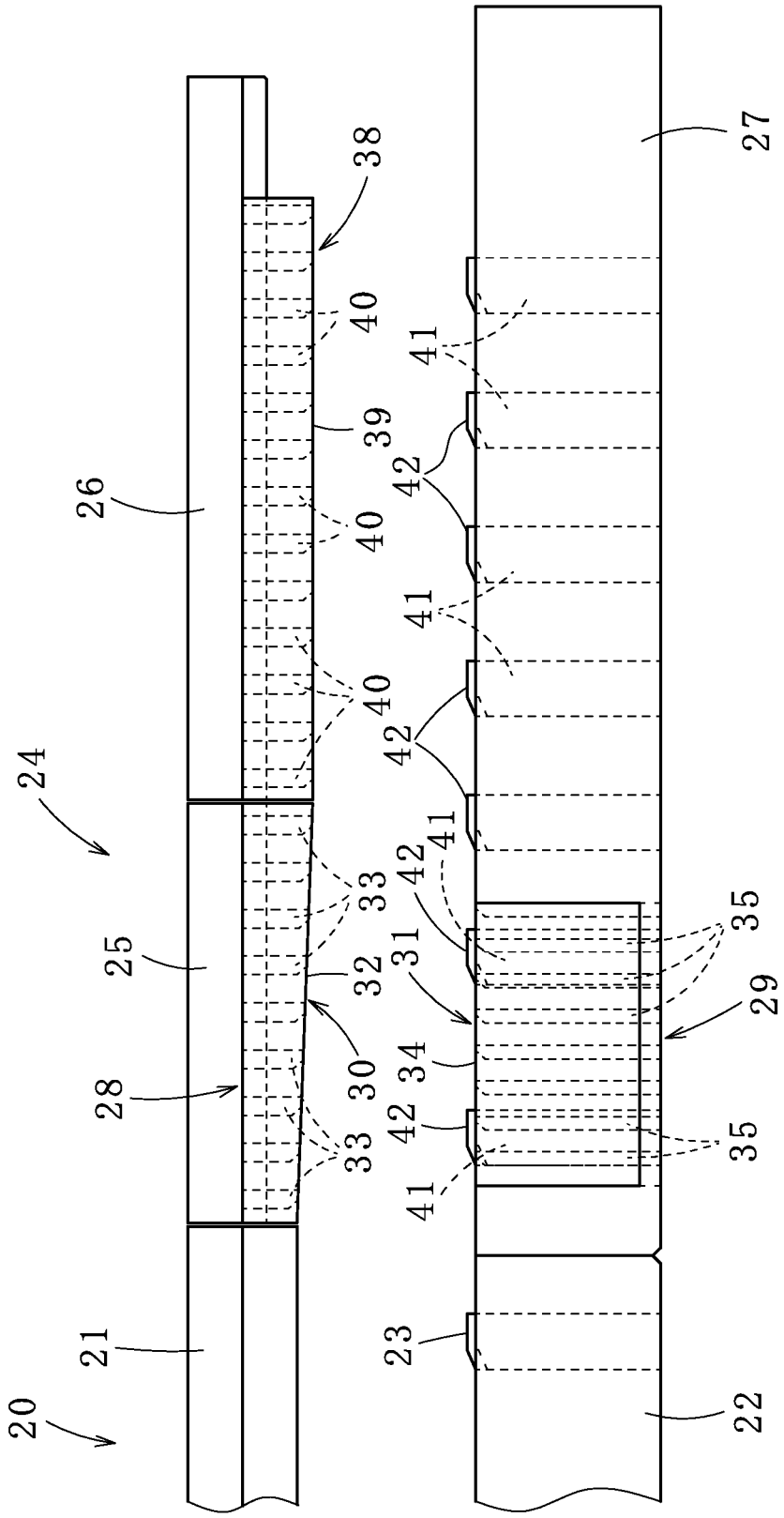
FIG. 2 is a side view of a die apparatus used in a separation step in the method for manufacturing band-shaped stator core sheets.
Figure 3:
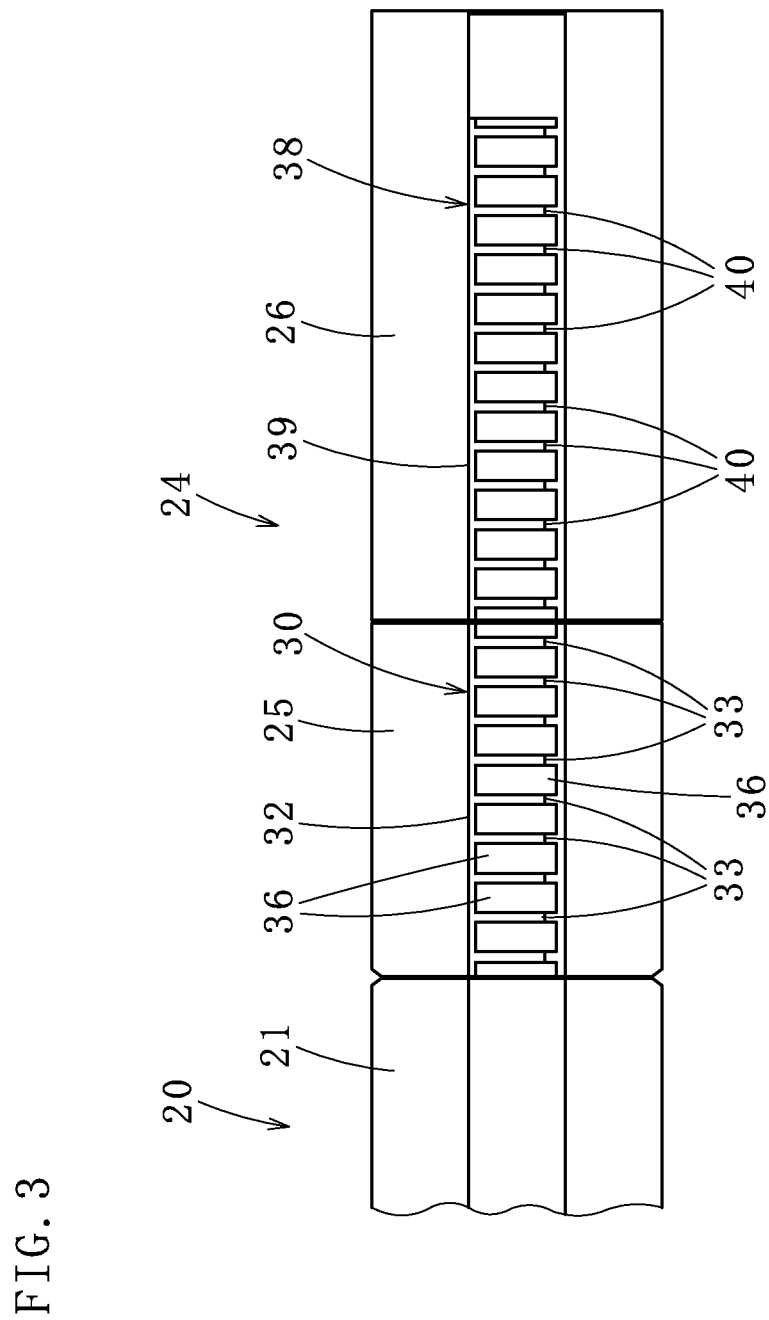
FIG. 3 is a bottom view of an upper die side of the die apparatus.
Figure 4:
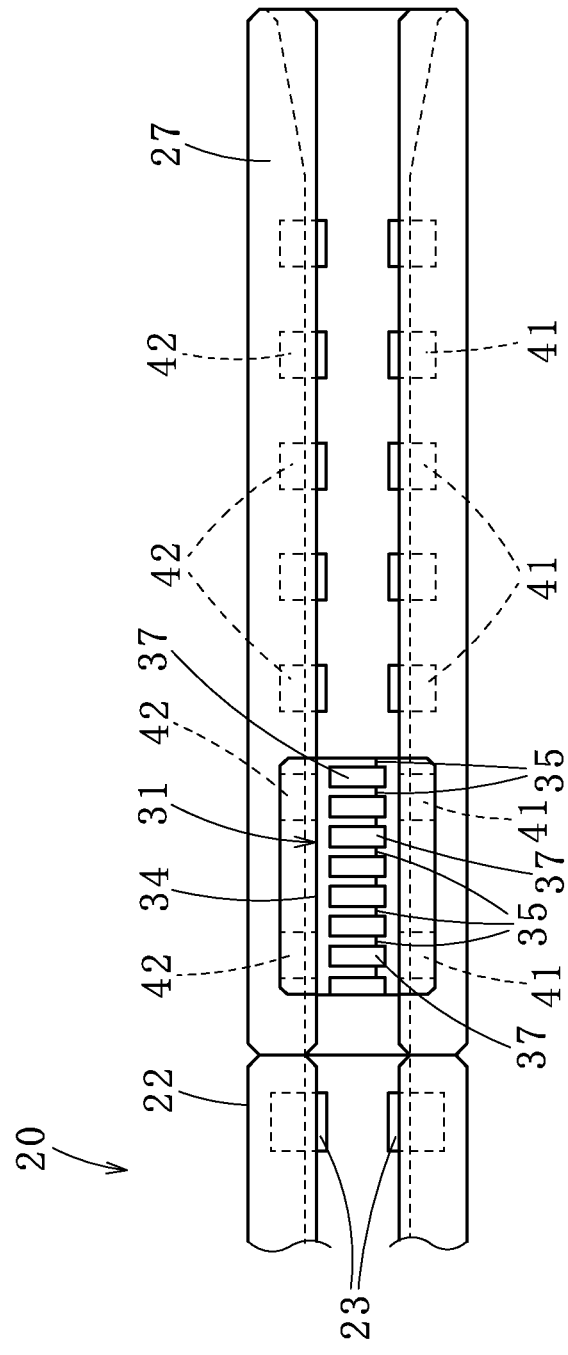
FIG. 4 is a plan view of a lower die of the die apparatus.

The respective magnetic pole pieces 12 and 13 of the two band-shaped core sheets 10 and 11 having been bent by the above shear-cutting step are returned to the original states (bending is corrected) using a die apparatus 20 illustrated in FIGS. 2-4.

The die apparatus 20 includes an upper die provided with a stripper plate 21 and a lower die provided with a die plate 22, and is operable to correct the bending of the respective magnetic pole pieces 12 and 13 by holding the band-shaped core sheets 10 and 11 between the stripper plate 21 and the die plate 22.

The lower die is provided with a plurality of lifters 23 capable of moving up and down. When the stripper plate 21 is under pressing operation, the lifters 23 retract into the die plate 22; when the stripper plate 21 is out of pressing operation, the lifters 23 project from the die plate 22 to support the two band-shaped core sheets 10 and 11 (in this embodiment, the yoke pieces 15 and 16), thereby allowing the band-shaped core sheets 10 and 11 to be easily conveyed.

(Separation Step)

By the above-described correction step, the tips of the magnetic pole pieces 12 and 13 are press-fitted to the inner peripheries of the yoke pieces 16 and 15, respectively. Because of this, when the band-shaped core sheets 10 and 11 are subsequently rolled up or, alternatively, wound and laminated, the separation of the band-shaped core sheets 10 and 11 having the engaged magnetic pole pieces 12 and 13 becomes difficult.

Therefore, the two band-shaped core sheets 10 and 11 respectively having the pressed back magnetic pole pieces 12 and 13 are separated from each other by a die apparatus 24 for use in the method for manufacturing band-shaped stator core sheets according to one embodiment of the present invention. The die apparatus 24 will be described below with reference to FIGS. 2-7.

The die apparatus 24 includes, as illustrated in FIGS. 2-4, an upper die provided with stripper plates 25 and 26, and a lower die 27. The stripper plate 25 disposed on an upstream side of the upper die is provided with an upper die separation part 28, and the lower die 27 is provided with a lower die separation part 29 on an upstream side thereof. The upper die separation part 28 and the lower die separation part 29 function to gradually separate vertically the two band-shaped core sheets 10 and 11 from each other toward a downstream side in the conveyance direction.

As illustrated in FIGS. 2-7, the upper die separation part 28 is provided with a first projection 30 which is brought into contact from above with the band-shaped core sheet 10 to be separated downward. The lower die separation part 29 is provided with a second projection 31 which is brought into contact from below with the band-shaped core sheet 11 to be separated upward.

The first projection 30 is configured, as illustrated in FIGS. 2, 3, and 5-7, to adapt to the band-shaped core sheet 10, and includes a yoke piece contact portion 32 having an undersurface which is brought into contact with the yoke piece 15, and magnetic pole piece contact portions 33 spaced at a predetermined pitch on one side of the yoke piece contact portion 32 and having undersurfaces which are brought into contact with the respective magnetic pole pieces 12. The second projection 31 is also configured, as illustrated in FIGS. 2, 4, 5 and 7, to adapt to the band-shaped core sheet 11, and includes a yoke piece contact portion 34 having an upper surface which is brought into contact with the yoke piece 16, and magnetic pole piece contact portions 35 spaced at a predetermined pitch on one side of the yoke piece contact portion 34 and having upper surfaces which are brought into contact with the respective magnetic pole pieces 13.

As illustrated in FIGS. 3 and 4, holes 36 between adjacent ones of the magnetic pole piece contact portions 33 of the first projection 30 are provided as clearance holes for the magnetic pole piece contact portions 35 of the second projection 31, while holes 37 between adjacent ones of the magnetic pole piece contact portions 35 of the second projection 31 are provided as clearance holes for the magnetic pole piece contact portions 33 of the first projection 30.

The first and second projections are not limited to the above-described configurations and may be configured to be brought into contact only with (some or all of) the magnetic pole pieces, or alternatively, only with (a part or the entire of) the yoke pieces.

As illustrated in FIG. 2, each of the magnetic pole piece contact portions 33 comprised in the above-described first projection 30 has a chamfer on an upstream side thereof so as to avoid catching on the band-shaped core sheet 10 being conveyed. Moreover, each of the magnetic pole piece contact portions 35 comprised in the second projection 31 also has a chamfer on an upstream side thereof so as to avoid catching on the band-shaped core sheet 11 being conveyed.

With regard to the respective yoke piece contact portions 32 and 34 comprised in the first and second projections 30 and 31, in a case where the entire yoke piece contact portions are brought into contact with the yoke pieces, the above chamfers are not provided. However, in a case where the yoke piece contact portions are partially brought into contact with the yoke pieces, the respective yoke piece contact portions may be provided with chamfers as needed on the upstream sides thereof.

The above configuration allows the undersurface of the first projection 30 and the upper surface of the second projection 31 to be brought into contact with the upper surface of the band-shaped core sheet 10 and the undersurface of the band-shaped core sheet 11, respectively, and it also prevents the first and second projections 30 and 31 from catching on the band-shaped core sheets 10 and 11 being conveyed, respectively.

In the first projection 30, as illustrated in FIG. 2, the undersurface of the yoke piece contact portion 32 and the undersurfaces of the respective magnetic pole piece contact portions 33 (an imaginary plane connecting the undersurfaces of the respective magnetic pole piece contact portions 33) are gradually sloped downward toward the downstream side in the conveyance direction of the band-shaped core sheets 10 and 11.

This is because that an attempt to abruptly separate the two band-shaped core sheets 10 and 11 from each other on an upstream side of the separation step may result in bending of the band-shaped core sheets 10 and 11 between the above-described correction step and the separation step. Therefore, the inclination angle of the undersurface of the first projection 30 can be appropriately set in a range that does not cause bending of the respective band-shaped core sheets 10 and 11. For example, the inclination angle can be set in a range of more than 0° but not more than 3° downward with reference to the horizontal position (0°).

In a case where the undersurface of the first projection 30 is sloped in this manner, also in the second projection 31, as illustrated in FIG. 2, the upper surface of the yoke piece contact portion 34 and the upper surfaces of the respective magnetic pole piece contact portions 35 (an imaginary plane connecting the upper surfaces of the respective magnetic pole piece contact portions 35) are gradually sloped downward at an angle smaller than the above inclination angle of the undersurface of the first projection 30 toward the downstream side in the conveyance direction of the band-shaped core sheets 10 and 11.

This (the inclination of the upper surface of the second projection 31) is intended to reduce, with respect to the second projection 31 disposed at the downstream side of the lower die separation part 29 at the separation step, the engaging amount of the respective magnetic pole pieces 12 of the band-shaped core sheet 10 pushed downward by the first projection 30. Such a configuration prevents the respective magnetic pole pieces 12 of the band-shaped core sheet 10 from catching on the second projection 31, thereby allowing smooth conveyance of the two band-shaped core sheets 10 and 11.

The inclination angle of the upper surface of the second projection 31 can be set smaller than the above-mentioned inclination angle of the undersurface of the first projection 30, e.g. in a range of more than 0° but not more than 2°.

The stripper plate 26 located at the downstream side of the upper die is provided with a third projection 38 configured to completely separate the band-shaped core sheets 10 and 11 from each other.

The third projection 38, as illustrated in FIGS. 2, 3, 5, and 6, has a configuration adapted to the band-shaped core sheet 10, and includes a yoke piece contact portion 39 which is brought into contact with the yoke piece 15, and magnetic pole piece contact portions 40 which are spaced at a predetermined pitch on one side of the yoke piece contact portion 39 and brought into contact with the respective magnetic pole pieces 12.

In the third projection 38, as illustrated in FIG. 2, an undersurface of the yoke piece contact portion 39 and undersurfaces of the respective magnetic pole piece contact portions 40 (an imaginary plane connecting the undersurfaces of the magnetic pole piece contact portions 40) are of a constant height. This is because that, unlike the above first projection 30, there is no possibility of the occurrence of bending in the respective band-shaped core sheets 10 and 11.

Figure 6:
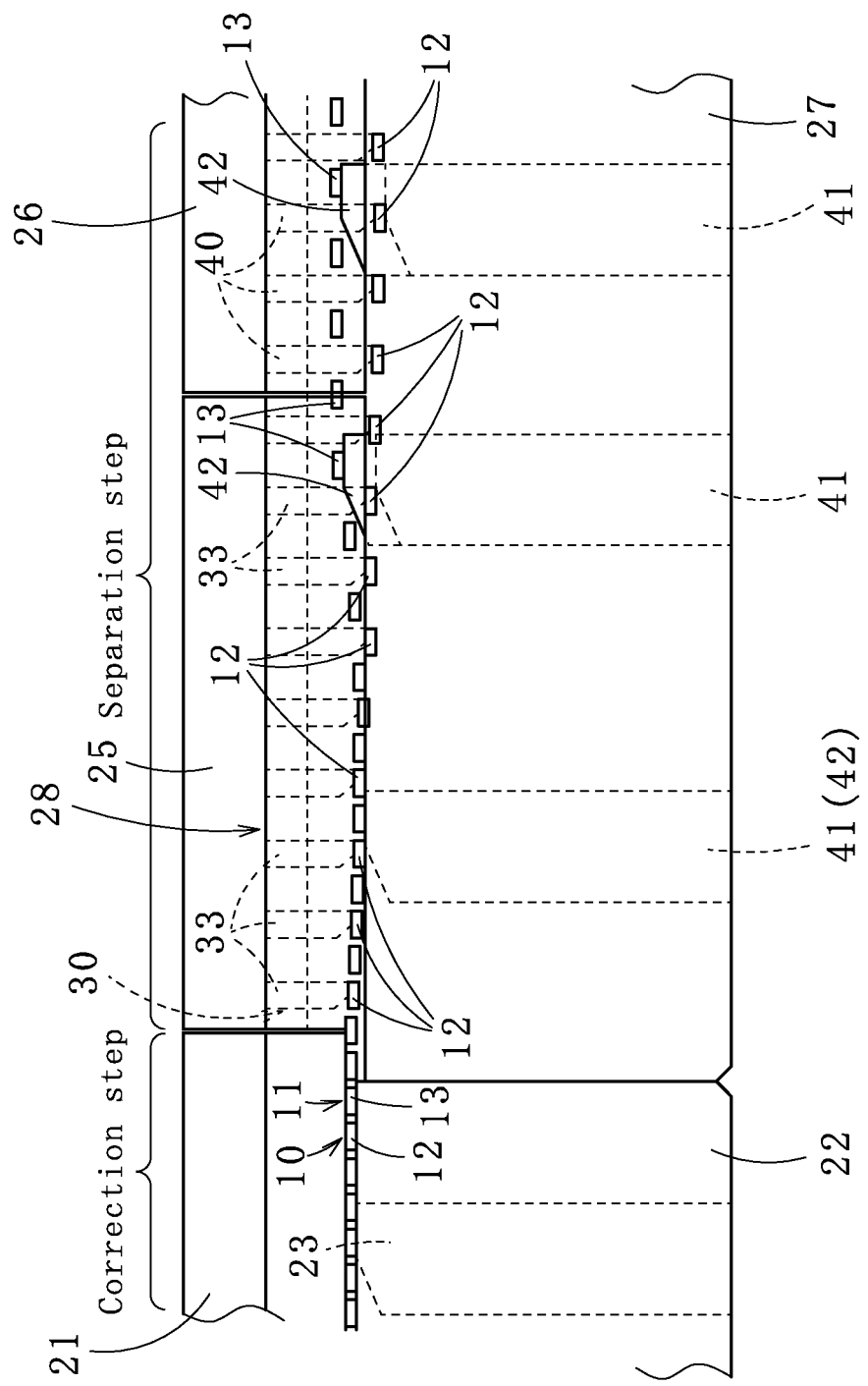
FIG. 6 is an explanatory diagram illustrating the operational state of the upper die separation part and lifters provided to the die apparatus.

As illustrated in FIGS. 2, 4, and 6, a plurality of lifters 41 and 42 capable of moving up and down are arranged from the upstream side to the downstream side of the lower die 27.

The lifters 41 and 42 are respectively disposed on both widthwise sides of the lower die 27. The lifters 41 disposed on one widthwise side support the yoke piece 15 of the band-shaped core sheet 10, while the lifters 42 disposed on the other widthwise side support the yoke piece 16 of the band-shaped core sheet 11. Therefore, projecting heights of the lifters 41 and 42 differ (the top surface position of the lifters 42 is higher than that of the lifters 41).

The lifters 41 and 42 that are arranged on the upstream side of the lower die 27 (the foremost lifters 41 and 42 in FIGS. 2, 4, and 6) retract into the lower die 27 when the stripper plate 25 is under pressing operation, and project from the lower die 27 when the stripper plate 25 is out of pressing operation so as to support the two band-shaped core sheets 10 and 11. Meanwhile, the other lifters 41 and 42 arranged at locations excluding the upstream side of the lower die 27 can respectively support the two vertically-separated laminated core sheets 10 and 11 because clearance holes are formed in the upper die separation part 28 and the stripper plate 26.

Figure 5:
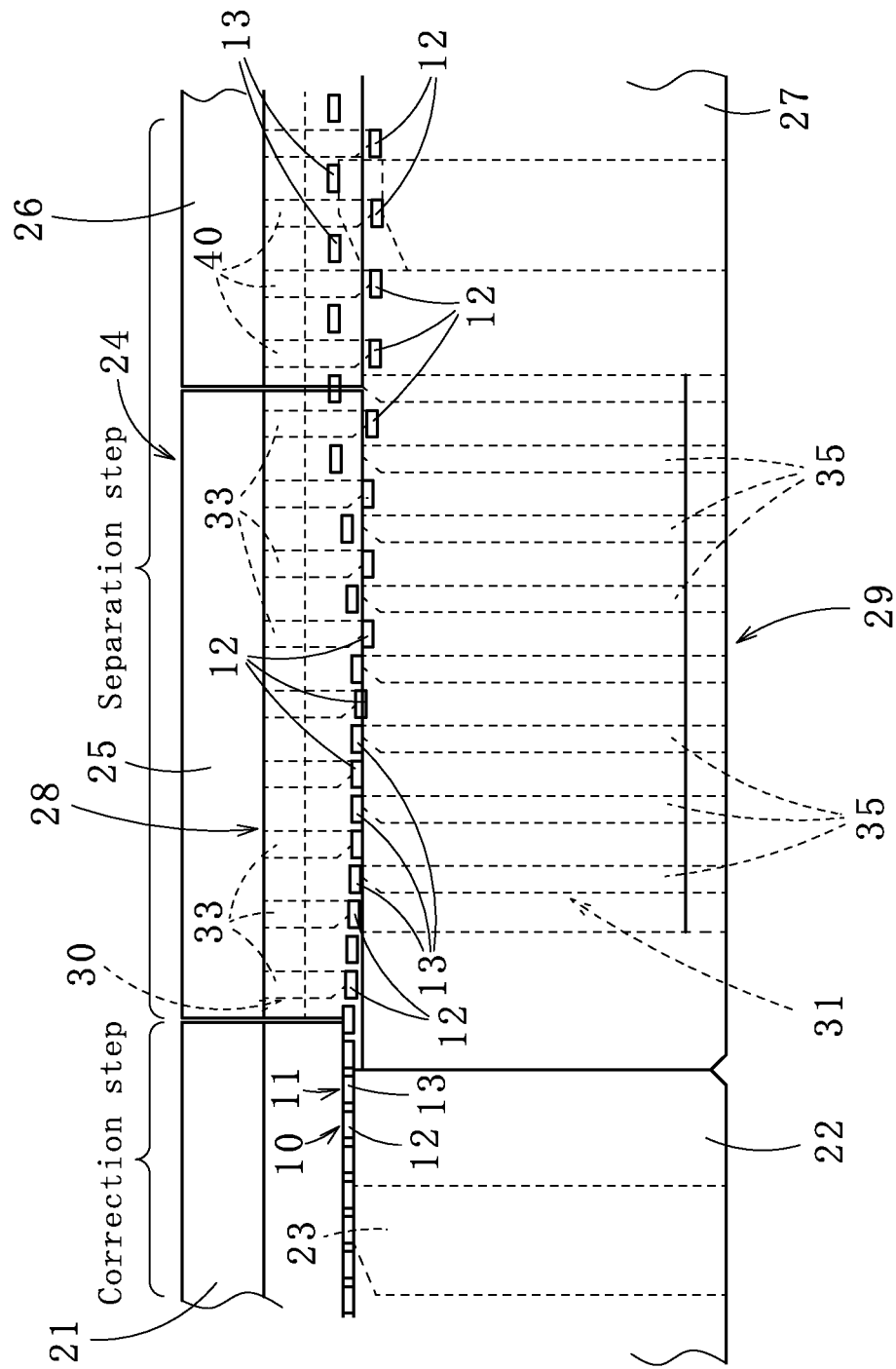
FIG. 5 is an explanatory diagram illustrating the operational state of an upper die separation part and a lower die separation part provided to the die apparatus.
Figure 7:
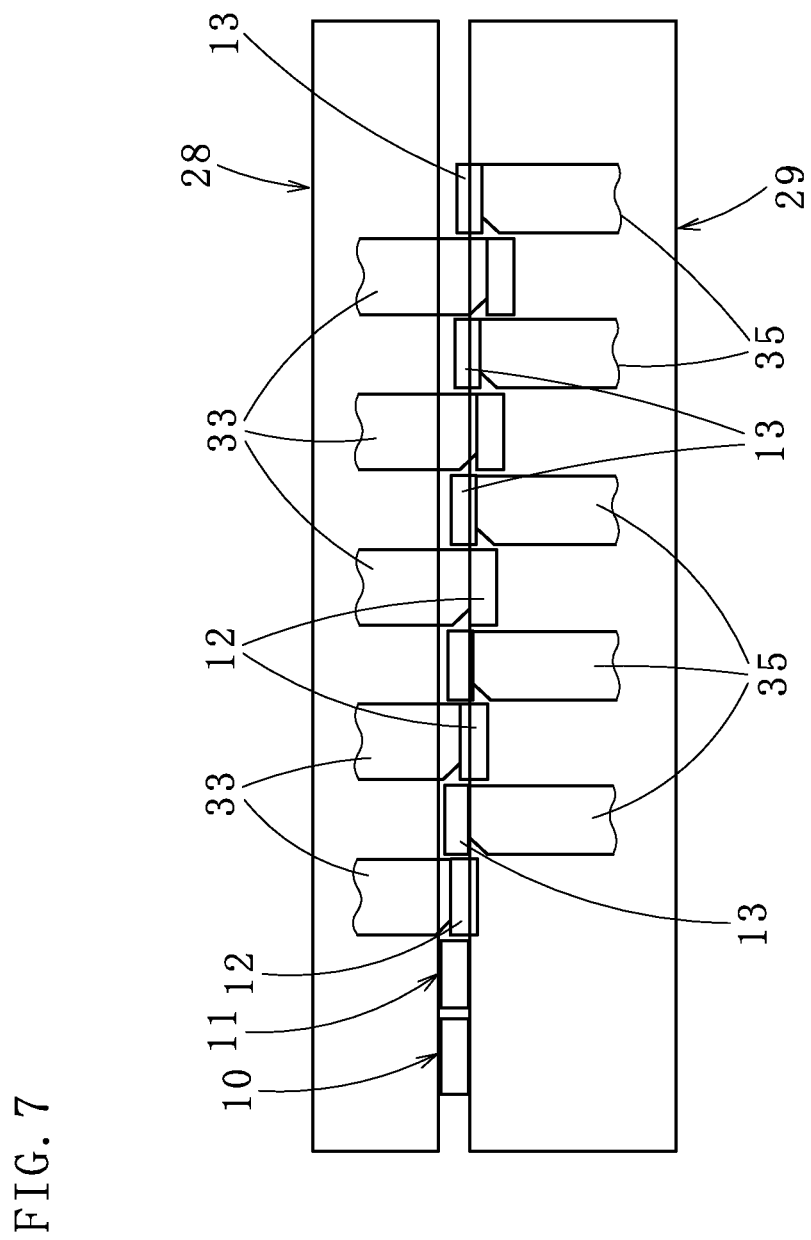
FIG. 7 is an explanatory diagram schematically illustrating the operational state of the upper die separation part and the lower die separation part provided to the die apparatus.

A method of separating the two band-shaped core sheets 10 and 11 using the above die apparatus 24 will now be described with reference to FIGS. 5-7. FIGS. 5-7 schematically illustrate the operational state of the first and second projections 30 and 31 of the die apparatus 24, the operational state of the first projection 30 and the lifters 41 and 42 of the die apparatus 24, and the separation process of the two band-shaped core sheets 10 and 11, respectively. The band-shaped core sheets 10 and 11 respectively with the magnetic pole pieces 12 and 13 having been straightened by the correction step are conveyed to the die apparatus 24 in the separation step, and are gradually separated vertically in such a manner as described below.

At the locations of the lifters 41 and 42 disposed on the most upstream side, the two band-shaped core sheets 10 and 11 are not yet separated from each other. Thus, the lifters 41 and 42 are lowered due to the effect of the band-shaped core sheets 10 and 11 being pressed by the upper die separation part 28 (see FIG. 6).

At locations past these lifters 41 and 42, the first projection 30 of the upper die separation part 28 engages about halfway with the second projection 31 of the lower die separation part 29 when viewed laterally, and thereby, the two band-shaped core sheets 10 and 11 are separated.

At locations of the lifters 41 and 42 after the two band-shaped core sheets 10 and 11 are separated, since the clearance holes for the lifters 41 and 42 are formed in the upper die separation part 28 as described above, the separated band-shaped core sheets 10 and 11 can be lifted upward by the lifters 41 and 42, respectively.

The above two band-shaped core sheets 10 and 11 are completely separated from each other on the downstream sides of the upper die separation part 28 and the lower die separation part 29 by the third projection 38, and are conveyed to the downstream side while being supported respectively by the lifters 41 and 42, and are rolled up.

Figure 8A:
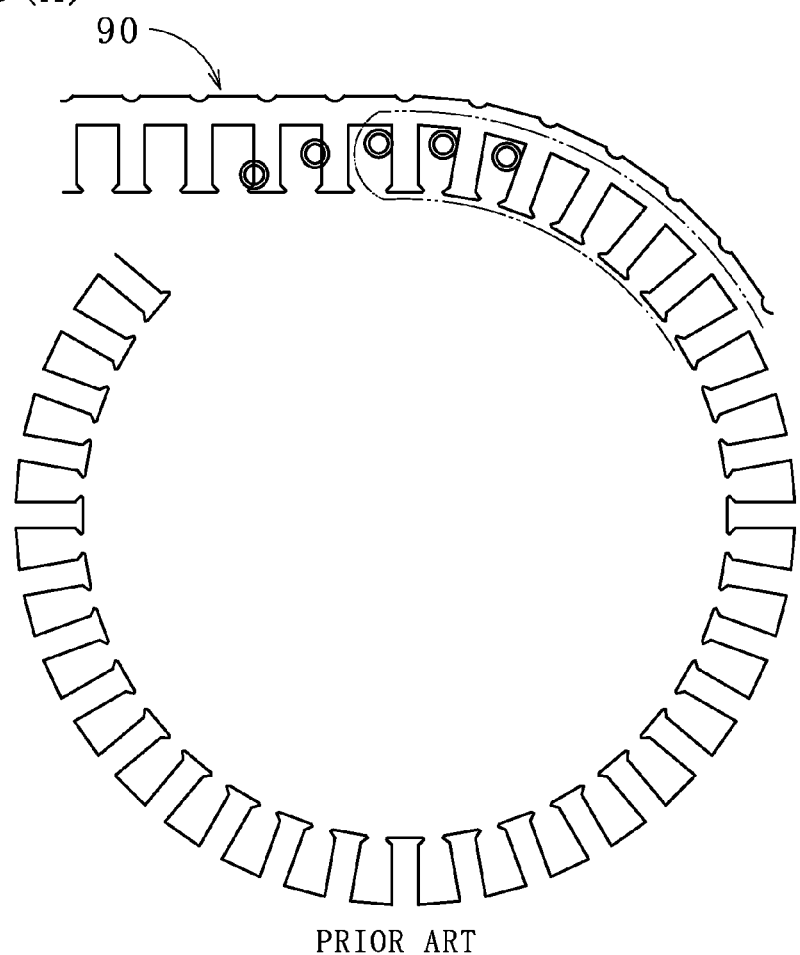
FIG. 8(A) is an explanatory diagram of a method for manufacturing a laminated core formed by helically laminating a band-shaped core sheet.
Figure 8B:
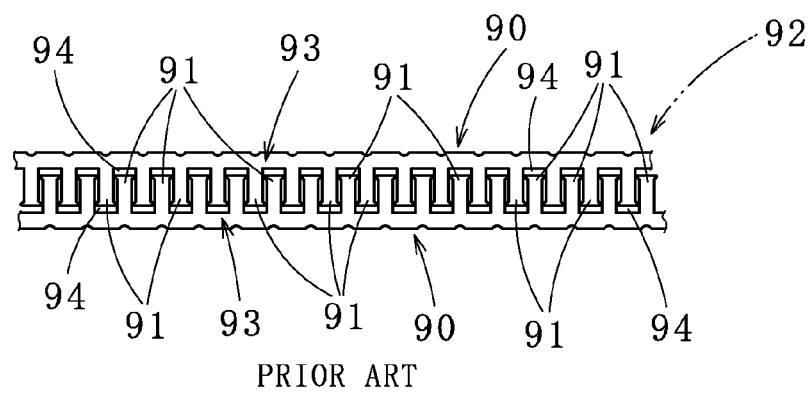
FIG. 8(B) is an explanatory diagram of a method for manufacturing band-shaped core sheets according to conventional example 1.

In use, the band-shaped core sheets 10 and 11 are helically wound and laminated, and e.g., welded across the entire length in the laminating direction before use (see FIG. 8(A)).

Although the present invention has been described with reference to a specific embodiment, the present invention is not intended to be limited to the above-described embodiment, but includes other embodiments and variations that are encompassed by the scope of the accompanying claims. For example, the present invention includes a case where the method for manufacturing band-shaped stator core sheets and the die apparatus used therefor are made by combining part of or all of the above-described embodiment and variations.

Figure 9:
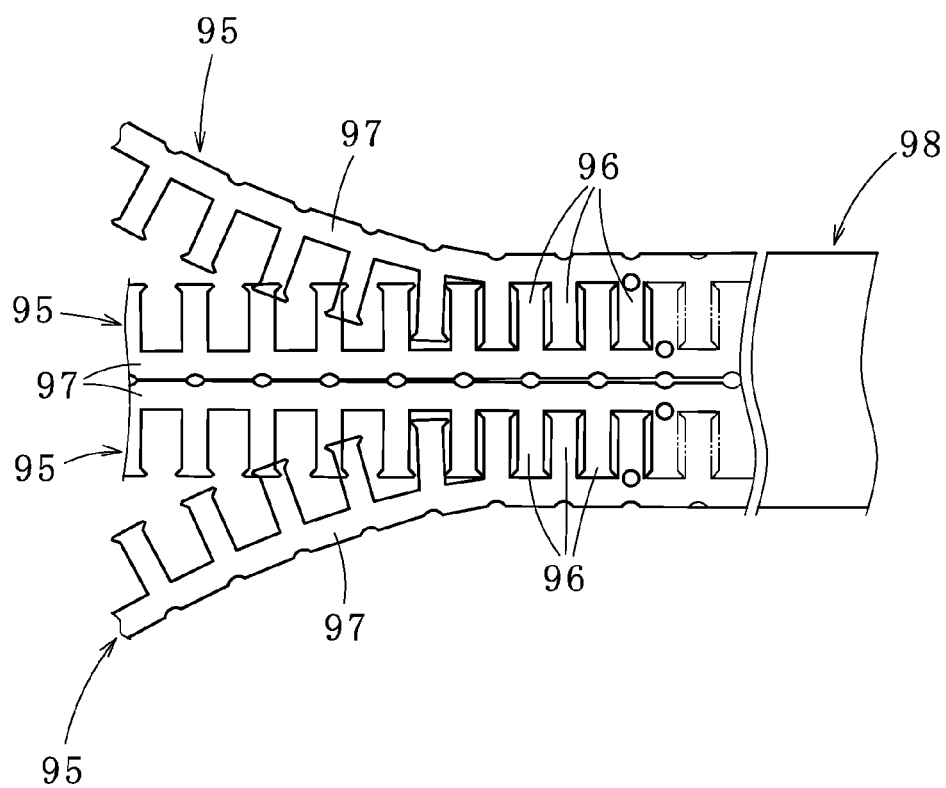
FIG. 9 is an explanatory diagram of a method for manufacturing band-shaped core sheets according to conventional example 2.

In the above embodiment, a case has been described in which the blank layout is performed such that the magnetic strip material includes two rows of the first and second band-shaped stator core sheets with the magnetic pole pieces engaged with one another. Alternatively, however, blank layout may be performed such that the magnetic strip material includes, in the widthwise direction, two sets of two rows of the first and second band-shaped stator core sheets i.e., a total of four rows of the band-shaped stator core sheets, with the magnetic pole pieces engaged with one another (see FIG. 9).

In the above embodiment, a case has been described in which the preparation step, the outline forming step, the slot punching step, the shear-cutting step, the correction step, and the separation step are sequentially performed. However, in a case where the tips of the respective magnetic pole pieces of the first and second band-shaped stator core sheets are shear-cut from the inner peripheries of the respective yoke pieces within the elastic limit of the magnetic strip material in the shear-cutting step, the separation step can be carried out without previously performing the correction step. This is because that since the magnetic strip material is shear-cut within the elastic limit, there is no possibility of the occurrence of bending in the respective magnetic pole pieces of the first and second band-shaped stator core sheets due to the shear-cutting (the magnetic pole pieces return to the original condition in a free state).

REFERENCE SIGNS LIST

10: first band-shaped core sheet, 11: second band-shaped core sheet, 12, 13: magnetic pole piece, 14: magnetic strip material, 15, 16: yoke piece, 17: notch, 18: pilot pin, 19: slot, 20: die apparatus, 21: stripper plate, 22: die plate, 23: lifter, 24: die apparatus, 25, 26: stripper plate, 27: lower die, 28: upper die separation part, 29: lower die separation part, 30: first projection, 31: second projection, 32: yoke piece contact portion, 33: magnetic pile piece contact portion, 34: yoke piece contact portion, 35: magnetic pile piece contact portion, 36, 37: hole, 38: third projection, 39: yoke piece contact portion, 40: magnetic pile piece contact portion, 41, 42: lifter

The invention claimed is:

1. A method for manufacturing band-shaped stator core sheets by performing blank layout such that a magnetic strip material includes at least two rows of first and second band-shaped stator core sheets with magnetic pole pieces of the first and second band-shaped stator core sheets engaged with one another and thereafter separating the first and second band-shaped stator core sheets from the magnetic strip material by press work, the method comprising:
   placing tips of respective magnetic pole pieces of the first band-shaped stator core sheet on an inner periphery of a yoke piece between adjacent ones of the magnetic pole pieces of the second band-shaped stator core sheet, and placing tips of the respective magnetic pole pieces of the second band-shaped stator core sheet on an inner periphery of a yoke piece between adjacent ones of the magnetic pole pieces of the first band-shaped stator core sheet;
   a slot punching step for punching out slots to form gaps of the respective magnetic pole pieces of the first and second band-shaped stator core sheets;
   a shear-cutting step for shear-cutting the tips of the respective magnetic pole pieces of the first and second band-shaped stator core sheets from the inner peripheries of the yoke pieces;
   a pressing correction step for returning the magnetic pole pieces of the first and second band-shaped stator core sheets having been bent by the shear-cutting step to their original states; and
   a separation step for separating the first and second band-shaped stator core sheets with the magnetic pole pieces having been pressed back by the pressing correction step,
   wherein the tips of the respective magnetic pole pieces of the first and second band-shaped stator core sheets are in contact with the inner peripheries of the yoke pieces, and
   wherein the separation step is performed after successively performing the shear-cutting step and the pressing correction step.

2. The method for manufacturing band-shaped stator core sheets according to claim 1, wherein, in the separation step, the first and second band-shaped stator core sheets are gradually separated vertically by an upper die separation part provided to an upper die and a lower die separation part provided to a lower die.

3. The method for manufacturing band-shaped stator core sheets according to claim 2, wherein, the upper die separation part is provided with a first projection adapted to be brought into contact from above with the first band-shaped stator core sheet, and the lower die separation part is provided with a second projection adapted to be brought into contact from below with the second band-shaped stator core sheet.

4. The method for manufacturing band-shaped stator core sheets according to claim 3, wherein an undersurface of the first projection is brought into contact with either one or both of the magnetic pole pieces and the yoke piece of the first band-shaped stator core sheet, and an upper surface of the second projection is brought into contact with either one or both of the magnetic pole pieces and the yoke piece of the second band-shaped stator core sheet.

5. The method for manufacturing band-shaped stator core sheets according to claim 3, wherein the first and second projections have chamfers on upstream sides thereof to be brought into contact with the magnetic pole pieces so as to avoid catching on the first and second band-shaped stator core sheets being conveyed.

6. The method for manufacturing band-shaped stator core sheets according to claim 3, wherein the undersurface of the first projection is gradually sloped downward toward a downstream side in a conveyance direction of the first and second band-shaped stator core sheets.

7. The method for manufacturing band-shaped stator core sheets according to claim 6, wherein the upper surface of the second projection is gradually sloped downward at an angle smaller than an inclination angle of the undersurface of the first projection toward the downstream side in the conveyance direction of the first and second band-shaped stator core sheets.

8. The method for manufacturing band-shaped stator core sheets according to claim 2, wherein the respective yoke pieces of the first and second band-shaped stator core sheets are supported by lifters provided to the lower die.

9. The method for manufacturing band-shaped stator core sheets according to claim 1, wherein the magnetic strip material includes the first and second band-shaped stator core sheets arranged in four rows.

\* \* \* \* \*